United States Patent
Hance et al.

(10) Patent No.: US 10,353,395 B2
(45) Date of Patent: Jul. 16, 2019

(54) IDENTIFICATION INFORMATION FOR WAREHOUSE NAVIGATION

(71) Applicant: X Development LLC, Mountain View, CA (US)

(72) Inventors: Christopher Hance, Mountain View, CA (US); Daniel Shaffer, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 92 days.

(21) Appl. No.: 15/276,193

(22) Filed: Sep. 26, 2016

(65) Prior Publication Data

US 2018/0088586 A1    Mar. 29, 2018

(51) Int. Cl.
*G06F 7/00*     (2006.01)
*G05D 1/02*     (2006.01)

(52) U.S. Cl.
CPC ... *G05D 1/0236* (2013.01); *G05D 2201/0216* (2013.01)

(58) Field of Classification Search
None
See application file for complete search history.

(56) References Cited

U.S. PATENT DOCUMENTS

| | | |
|---|---|---|
| 2005/0289020 A1 | 12/2005 | Bruns et al. |
| 2007/0276558 A1 | 11/2007 | Kim |
| 2008/0077511 A1 * | 3/2008 | Zimmerman .......... G06Q 10/00 705/28 |
| 2009/0119010 A1 | 5/2009 | Moravec |
| 2009/0180667 A1 | 7/2009 | Mahan et al. |
| 2009/0198376 A1 | 8/2009 | Friedman et al. |
| 2010/0121481 A1 | 5/2010 | Talley et al. |
| 2012/0330458 A1 | 12/2012 | Weiss |
| 2014/0267703 A1 | 9/2014 | Taylor et al. |
| 2014/0278097 A1 | 9/2014 | Khorsheed et al. |

(Continued)

OTHER PUBLICATIONS

Motorola White Paper, "The Synchronized Distribution Supply Chain: Best Practices in Warehouse Management," Motorola, Inc.; motorola.com/supplychainmobility, Mar. 2011.

(Continued)

*Primary Examiner* — Yolanda R Cumbess
(74) *Attorney, Agent, or Firm* — McDonnell Boehnen Hulbert & Berghoff LLP

(57) ABSTRACT

An example method includes receiving image data captured by a sensor on a robotic device. The robotic device is in a warehouse, including multiple inventory items stored at storage locations in the warehouse. Each inventory item has an on-item identifier that identifies it in a warehouse management system (WMS), each storage location has a storage-location identifier that identifies it in the WMS, and a first on-item identifier for a first inventory item is associated in the WMS with a first storage-location identifier for a first storage location. The method includes analyzing the received sensor data to detect an identifier captured by the sensor. The detected identifier includes one or both of the first on-item identifier and the first storage-location identifier. The method includes determining a warehouse location associated with the detected identifier and, based on the warehouse location, determining a location of the robotic device within the warehouse.

21 Claims, 13 Drawing Sheets

(56) References Cited

U.S. PATENT DOCUMENTS

| | | | |
|---|---|---|---|
| 2014/0350725 A1 | 11/2014 | LaFary et al. | |
| 2014/0365258 A1 | 12/2014 | Vestal et al. | |
| 2015/0139766 A1 | 5/2015 | Cousins | |
| 2015/0363758 A1 | 12/2015 | Wu et al. | |
| 2016/0236865 A1 | 8/2016 | Altemir | |
| 2017/0225891 A1* | 8/2017 | Elazary | G05D 1/0234 |
| 2017/0278047 A1* | 9/2017 | Welty | B65G 1/0492 |
| 2017/0305013 A1* | 10/2017 | Freeman | B25J 9/1664 |
| 2018/0086561 A1* | 3/2018 | Stubbs | B65G 1/137 |
| 2018/0088586 A1* | 3/2018 | Hance | G05D 1/0236 |
| 2018/0120116 A1* | 5/2018 | Rombouts | B25J 9/1697 |

OTHER PUBLICATIONS

Moschetta, Jean, "Autonomous Transport Agents: Simulating warehouse operation on a bi-directional rail network," BSci Final Year Individual Project Final Report, dated June 17, 2010, 79 pages; (https://www.doc.ic.ac.uk/teachin/distinguished-projects/2010/).

International Search Report issued in co-pending International Patent Application No. PCT/US2017/052703, ISA/KR, Korean Intellectual Property Office, dated Jan. 11, 2018, 3 pages.

Written Opinion issued in co-pending International Patent Application No. PCT/US2017/052703, ISA/KR, Korean Intelleclual Property Office, dated Jan. 11, 2018, 10 pages.

\* cited by examiner

IDENTIFICATION INFORMATION FOR WAREHOUSE NAVIGATION

BACKGROUND

One or more robotic devices and/or other actors can move throughout a storage environment to perform actions related to the storage and shipment of items. One example storage environment is a warehouse, which may be an enclosed building having rows of storage racks on which items may be stored. In some cases, multiple inventory objects (e.g., boxes, packages, and/or cases) may be stored on pallets, and the pallets may be stacked vertically. As such, an item stored in a warehouse may be an inventory object and/or a pallet of inventory objects. The warehouse may also include a loading dock used for loading and/or unloading items from delivery trucks or other types of vehicles.

A warehouse management system (WMS) may be employed to facilitate operations within the warehouse environment. For example, the WMS can track the identity and location of items stored in and moved around the warehouse environment. One approach to tracking items in the warehouse uses barcodes attached to storage locations in the warehouse (i.e., "storage-location barcodes") and barcodes attached to items (i.e., "on-item barcodes"). For instance, each storage rack in the warehouse may be marked with a respective storage-location barcode, and the WMS may store, for each storage-location barcode, an indication of a physical location corresponding to the storage rack within the warehouse (e.g., location coordinates). To move a particular item to and/or from a particular storage location, an operator may scan the on-item barcode and the storage-location barcode when the item is deposited or removed from the storage location. The operator may then upload the two scanned barcodes to the WMS to record the deposit or removal of the item at the storage location.

SUMMARY

Example systems, methods, and devices of the present disclosure facilitate locating and navigating a robotic device within a warehouse environment. The robotic device includes a sensor that captures sensor data. The systems, methods, and devices of the present disclosure use the captured sensor data to, among other things, detect one or more on-item identifiers and/or one or more storage-location identifiers. The systems, methods, and devices then use the detected on-item and/or storage location identifier(s) to assist in determining the location of the robotic device and/or navigating the robotic device to a target location.

In an example, the sensor can be a camera, the sensor data can be image data captured by the camera, the on-item identifier(s) can be on-item barcode(s), and the storage-location can be storage-location barcode(s). In this example, a computing system can receive the image data from the camera of the robotic device, and determine the location of the robotic device based, at least in part, on the storage-location barcode(s) and/or the on-item barcode(s) captured in the image data. For instance, the computing system can detect a storage-location barcode in the image data and responsively lookup in a WMS a physical location in the warehouse (i.e., a "warehouse location") that corresponds to the detected storage-location barcode. As another example, the computing system may detect an on-item barcode in the image data, determine a storage location corresponding to the detected on-item barcode in the WMS, and then determine from the WMS the physical location in the warehouse that corresponds to the determined storage location. Based on the determined location in the warehouse and perhaps other factors, the computing system can provide the robotic device with navigation instructions and/or track movements of the robotic device within the warehouse.

Unlike conventional approaches to locating and navigating a robotic device in a warehouse, the present disclosure provides for locating and navigating a robotic device in a warehouse environment without requiring modifications to warehouse infrastructure for aiding navigation such as by adding fiducial marks (e.g., April tags, QR codes or reflectors) to the warehouse environment. Indeed, the robotic devices may already include a sensor and capture sensor data for various other purposes such as, for example, to detect and avoid obstacles and/or to manipulate items within the warehouse. And the storage locations and items may already have storage-location identifiers and on-item identifiers, respectively, for tracking the identity and location of the inventory items within the warehouse. In one respect, the present disclosure can thus advantageously leverage existing infrastructure to provide for improved locating and navigating of robotic devices within a warehouse environment.

In one example, a method includes receiving sensor data captured by a sensor coupled to a robotic device and, responsive to receiving the sensor data, performing an analysis of the sensor data. The method also includes detecting an identifier captured by the sensor using the analysis of the received sensor data, determining a warehouse location associated with the identifier in a WMS, and determining, based on the warehouse location, a location of the robotic device in a warehouse environment. The robotic device is deployed in the warehouse environment, a plurality of inventory items are stored at a plurality of storage locations in the warehouse environment, each inventory item has an on-item identifier that identifies the inventory item in the WMS, and each storage location has a storage-location identifier that identifies the storage location in the WMS. A first on-item identifier for a first inventory item of the plurality of inventory items is associated in the WMS with a first storage-location identifier for a first storage location of the plurality of storage locations. The identifier detected using the analysis of the sensor data includes one or both of the first on-item identifier and the first storage-location identifier.

In another example, a system includes a robotic device deployed in a warehouse environment, a sensor coupled to the robotic device, and a computing system. The sensor is configured to capture sensor data. The computing system is configured to receive the sensor data captured by the sensor and, responsive to receiving the sensor data, perform an analysis of the sensor data. The computing system is also configured to detect an identifier captured by the sensor using the analysis of the sensor data, determine a warehouse location associated with the identifier in a WMS, and determine, based on the warehouse location, a location of the robotic device in the warehouse environment. A plurality of inventory items are stored at a plurality of storage locations in the warehouse environment, each inventory item has an on-item identifier that identifies the inventory item in the WMS, and each storage location has a storage-location identifier that identifies the storage location in the WMS. A first on-item identifier for a first inventory item of the plurality of inventory items is associated in the WMS with a first storage-location identifier for a first storage location of the plurality of storage locations. The identifier detected using the analysis of the sensor data includes one or both of the first on-item identifier and the first storage-location identifier.

In a further example, a robotic device includes a sensor and a computing system. The sensor is configured to capture sensor data. The computing system is configured to receive the sensor data captured by the sensor and, responsive to receiving the sensor data, perform an analysis of the sensor data. The computing system if also configured to detect an identifier captured by the sensor using the analysis of the sensor data, determine a warehouse location associated with the identifier in a WMS, and determine, based on the warehouse location, a location of the robotic device in a warehouse environment. The robotic device is deployed in the warehouse environment, a plurality of inventory items are stored at a plurality of storage locations in the warehouse environment, each inventory item has an on-item identifier that identifies the inventory item in the WMS, and each storage location has a storage-location identifier that identifies the storage location in the WMS. A first on-item identifier for a first inventory item of the plurality of inventory items is associated in the WMS with a first storage-location identifier for a first storage location of the plurality of storage locations. The identifier detected using the analysis of the sensor data includes one or both of the first on-item identifier and the first storage-location identifier The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
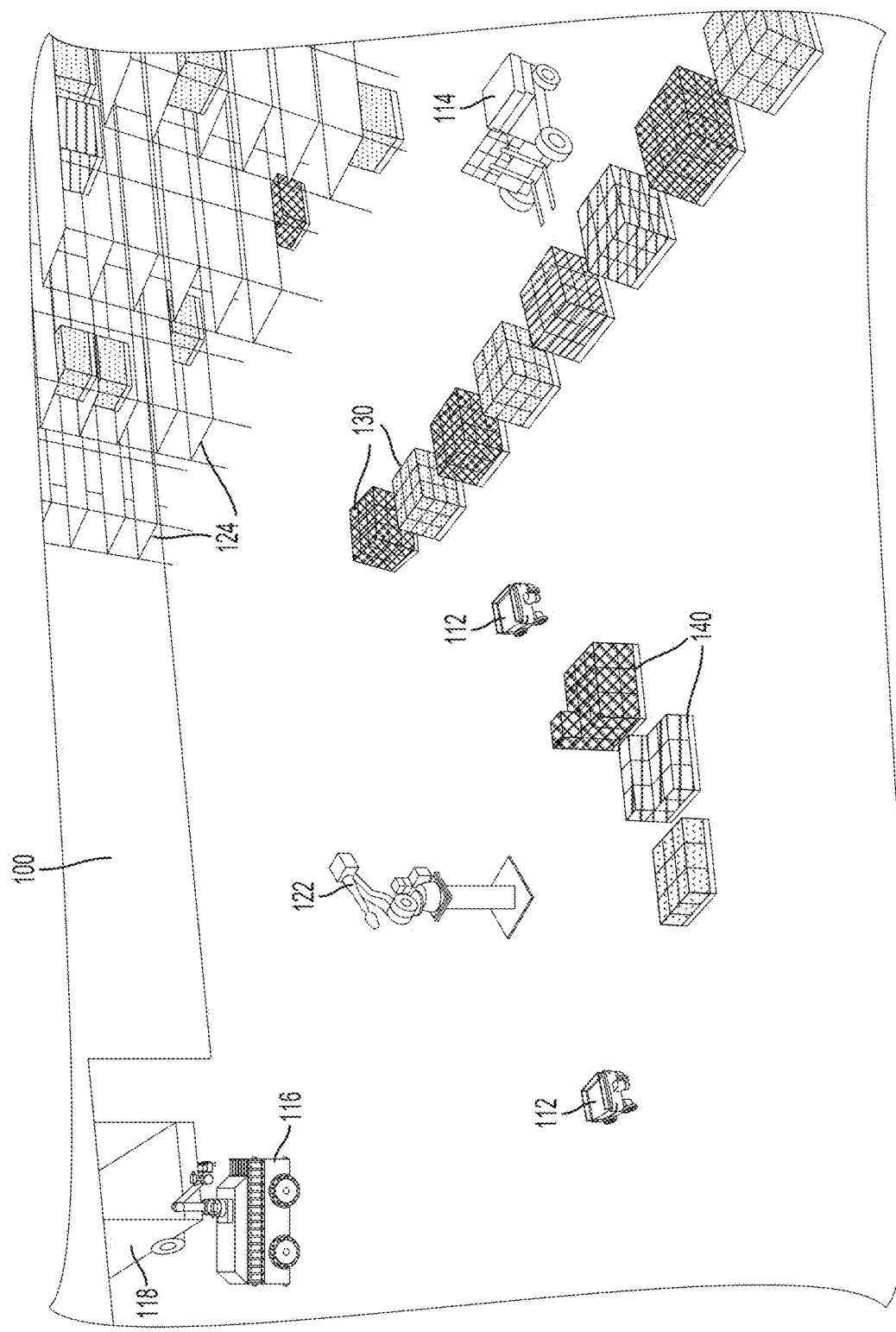
FIG. 1A illustrates a robotic fleet, according to an example implementation.

Example methods, systems, and devices are described herein. Any example embodiment or feature described herein is not to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

To efficiently operate a warehouse, it can be beneficial to know the location of the robotic device(s) that perform warehouse operations and to provide navigation instructions to the robotic device(s) to facilitate completing such operations. In an example, the present disclosure provides for systems, devices, and methods that facilitate locating and navigating a robotic device within a warehouse based, at least in part, on the robotic device capturing an image of one or more storage-location barcodes at storage locations within the warehouse and/or one or more on-item barcodes on items stored at the storage locations within the warehouse. More generally, the present disclosure provides for systems, devices, and methods that facilitate locating and navigating a robotic device within a warehouse based, at least in part, on one or more storage-location identifiers and/or one or more on-item identifiers detected in sensor data captured by a sensor of the robotic device. As such, the present disclosure provides for locating and navigating a robotic device based, at least in part, on barcodes or other identifiers used for warehouse inventory tracking.

An example warehouse may be a fulfillment warehouse in which items are selected, sorted, and packaged for shipment to customers. Items may be arranged or organized within the warehouse to improve efficiency of this process based on customer demand, product size, weight, shape, or other characteristic. Inventory objects may be stored on pallets, which may be stacked on top of each other and/or on storage racks that extend upwards (e.g., multi-level shelving) at storage locations within the warehouse. Further, each item and storage location may include a barcode or other identifier that identifies the item and storage location, respectively.

An identifier that identifies a storage location may be referred to as a storage-location identifier and an identifier that identifies an inventor item may be referred to as an on-item identifier. Similarly, as noted above, a barcode that identifies a storage location may be referred to as a storage-location barcode and a barcode that identifies an inventory item may be referred to as an on-item barcode. The storage-location barcodes and on-item barcodes can be one-dimensional barcodes (i.e., a linear barcode) and/or two-dimensional barcodes (i.e., a matrix barcode). One example of a two-dimensional barcodes is a QR code.

Example systems, devices, and methods are described below in the context of storage-location barcodes and on-item barcodes, which can be detected by a camera; however, the principles described below can extend to apply to systems, devices, and methods using other types of storage-location identifiers and on-item identifiers (e.g., radio-frequency identification (RFID) identifiers), which can be detected by other types of sensors (e.g., an RFID reader) in other examples.

A computer-based WMS can be implemented for the warehouse. The WMS can store information related to the items and/or storage locations, as well as one or more robotic devices operating in the warehouse. For instance, the WMS can include information about the location within the warehouse of each item, storage location, and/or robotic device. This information may be used to coordinate the robotic devices to allow them to carry out one or more functions, such as fulfilling an order for a customer. It may also be used to track an inventory of items in the warehouse.

In an example, the WMS can utilize a database that specifies for each storage location in the warehouse, on a per storage location basis, a record of associated data entries for different items, barcodes, and/or physical warehouse locations. For instance, each record can be a row in a table having columns for fields that include indications of the storage-location barcode of the storage location, the on-item barcode(s) of the item(s) stored at the storage location, and the physical location of the storage location in the warehouse. The physical location of the storage location in the warehouse can be represented by, for example, coordinates of the storage location on a coordinate system spatially mapped to the physical space of the warehouse. Thus, with knowledge of a storage-location barcode and/or an on-item barcode, the WMS can identify a record in the database from which a physical location in the warehouse can be determined.

In line with the discussion above, the data stored in the database can be, at least in part, based on inventory tracking operations carried out by robotic devices and/or operators in the warehouse. For example, when an item is deposited at or removed from a particular storage location, a robotic device or operator can scan the storage-location barcode at the storage location and the on-item barcode on the item. The robotic device and/or operator can then transmit the storage-location barcode and the on-item barcode to the WMS, which updates the database to indicate that the item was deposited at or removed from the storage location. In this way, the WMS can use the storage-location barcodes and on-item barcodes to facilitate tracking the inventory of items within the warehouse.

The robotic device(s) can be autonomous guided vehicles (AGV) such as, for example, pallet jacks, fork trucks, truck loaders/unloaders, and/or other devices. Each robotic device may be autonomous or partially autonomous. Further, each robotic device can include a vision system having a camera, which facilitates the robotic device navigating through the warehouse and/or manipulating items. In examples, the robotic device can use the camera to capture image data to sense its environment and/or manipulate items while carrying out warehouse operations. For instance, the robotic device can use the camera to avoid obstacles while navigating the warehouse and/or to operate grippers or forklifts that can deposit and remove an item at a storage location. The image data captured for these and perhaps other purposes may include images of one or more storage-location barcodes and/or one or more on-item barcodes in the warehouse environment.

In an example, the WMS can receive the image data captured by camera of the robotic device. The WMS can analyze the received image data to detect the one or more storage-location barcodes and/or the one or more on-item barcodes. Responsive to the WMS detecting a storage-location barcode, the WMS can access the database to determine the physical location in the warehouse that corresponds to the storage location associated with the detected storage-location barcode. Similarly, responsive to the WMS detecting an on-item barcode, the WMS can access the database to determine the record for the storage location corresponding to the detected on-item barcode and then, based on the determined storage location, the WMS can determine the physical location in the warehouse at which the item associated with the on-item barcode is stored.

In one example, the WMS can determine that the physical location of the detected storage-location barcode(s) and/or on-item barcode(s) is the physical location of the robotic device. In another example, the WMS can further analyze the captured image data to determine a distance and/or orientation of the robotic device relative to the determined physical location of the detected barcode(s). For example, the WMS may analyze the captured image data to determine a size and/or shape of the detected barcode(s) and then compare the determined size and/or shape to a reference size and/or a reference shape stored by the WMS for the detected barcode(s). Based on the comparison, the WMS can determine the distance and/or orientation of the robotic device relative to the detected barcode(s).

Based on the location of the robotic device determined from the detected barcode(s), the WMS can provide the robotic device with navigation instructions. In examples, the WMS can provide the robotic device with navigation instructions for completing a new task and/or the WMS can update navigation instructions for a previously assigned task. Additionally or alternatively, the WMS can determine the location of the robotic device for purposes of tracking the progress of the robotic device along a route assigned to the robotic device for completing a task.

In some examples, the movement of the robotic device and/or the orientation of the camera on the robotic device may be actively steered to obtain image data including storage-location barcode(s) and/or on-item barcode(s). For instance, the camera may be angled upwards and/or to the side of the robotic device while it moves through the warehouse to capture storage-location and/or on-item barcodes that are placed above and to the side of the robotic device (such as on shelves of storage racks placed along an aisle).

Still further examples may include balancing the need for location information with the need for safe and accurate navigation of a robotic device. This may involve weighing the value or importance of information that could be gained by using the camera to scan storage-location and/or on-item barcodes against the expected decrease in capability of the robotic device to detect obstacles in its path or otherwise safely navigate. In some instances, if an obstacle obstructs the field of view of a camera, the camera on the robotic device may be angled upwards or sideways in order to capture storage-location and/or on-item barcodes at elevated positions. But this information may come at a cost, because the camera may no longer be able to see obstacles on the ground as easily. This trade-off may be beneficial, especially where the location information gained by angling the camera upward is valuable and the likelihood of running into an obstacle is small.

In examples, the WMS can be separate from robotic device, and can be communicatively coupled to robotic device via a wireless connection. Alternatively, in some examples the WMS can be coupled to robotic device via a wired connection, and/or can be a component of robotic device itself. In other examples, WMS may include components located in both robotic device and elsewhere, such that performance of the functions of the WMS described herein may be done by a component on robotic device, a central computing device, or a combination thereof. In still other examples, WMS may be distributed across two or more robotic devices, such that a peer-to-peer network of robotic devices including a computing system is formed.

II. Example Environment

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks or shelving for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other. In general, the terms "item" or "inventory item" may refer to an inventory object, a box, a case, or a pallet loaded with one or more inventory objects, boxes, or cases.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

As used herein, a storage location is a location in the warehouse at which one or more items can be stored. A storage location can include, for example, a ground space in the warehouse and/or a storage rack. As another example, a storage location can be a particular shelf of a particular storage rack in a particular aisle of the warehouse. As will be described further below, each storage location in the warehouse can be at respective physical location having coordinates in a coordinate system mapped over the physical space of the warehouse. Also, as described below, each storage location in the warehouse can be marked with a storage-location barcode that uniquely identifies the storage location.

Figure 1B:
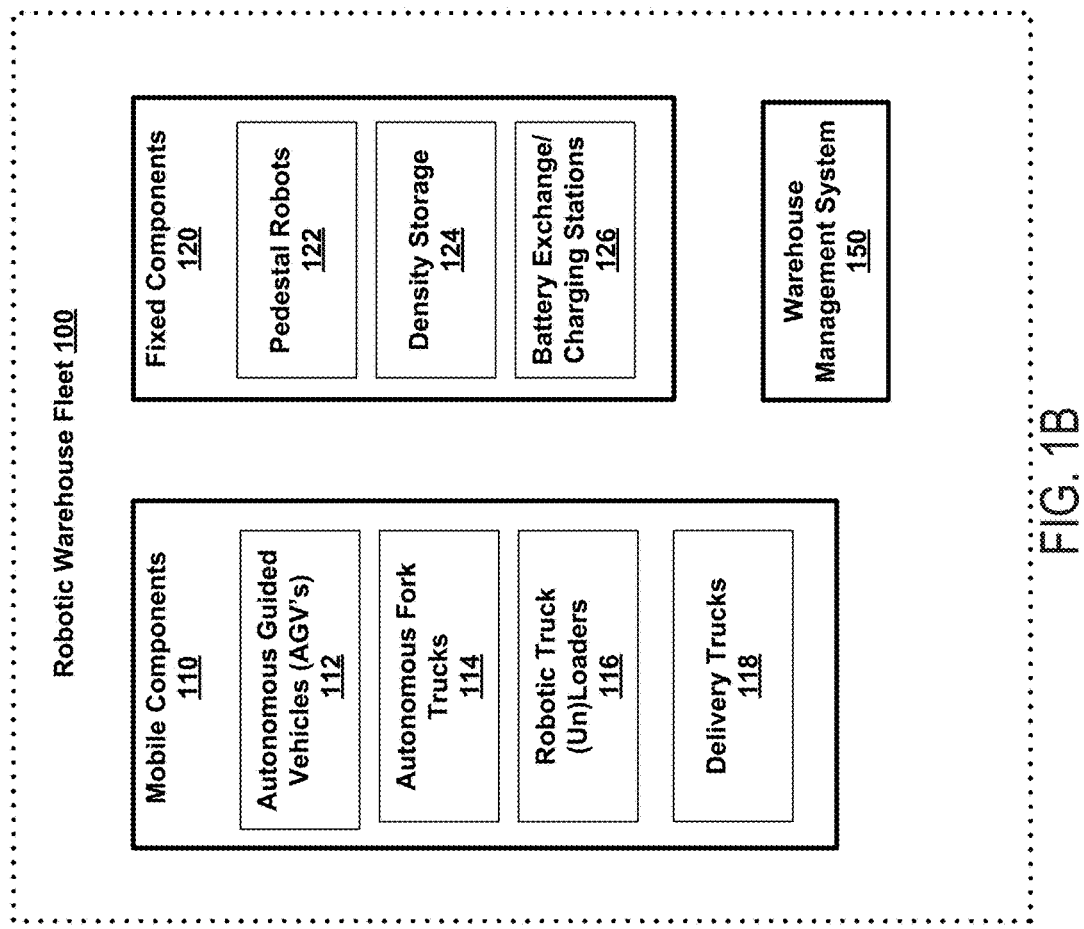
FIG. 1B illustrates a functional block diagram showing components of a robotic fleet, according to an example implementation.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage racks 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a WMS 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a physical space of the warehouse before determining placement of certain fixed components 120, such as the pedestal robots 122, the storage racks 124, or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

The location of each fixed component 120 can be stored in the WMS 150. For example, the physical space of the warehouse can be spatially mapped to a coordinate system, and each fixed component 120 can be recorded in the WMS 150 as a respective coordinate position in the coordinate system. The coordinate system can be a two-dimensional coordinate system and/or a three-dimensional coordinate system such that the location of each fixed component 120 can correspond a two-dimensional coordinate position and/or a three-dimensional coordinate position, respectively.

In some examples, WMS 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

The central planning system may also be distributed across individual system components. For example, WMS 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robotic device close to a target location, at which point local vision of the robotic device may take over. In some examples, most robotic functions may be position-controlled to get the robots relatively close to target locations, and then vision and handshakes may be used when needed for local control.

In further examples, visual handshakes may enable two robots to identify one another by barcode, QR code, augmented reality tag (AR tag), or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a warehouse management system may sometimes fail, such as when a robotic device gets stuck or when packages get dropped in a location and lost. Local robot vision may also therefore provide robustness by inserting redundancy to handle cases where the warehouse management system fails in part. For instance, as an automatic pallet jack passes and identifies an object, the pallet jack may send information up to a remote, cloud-based server system. Such information may be used to fix errors in central planning, help to localize robotic devices, or to identify lost objects.

In further examples, a warehouse management system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out). In addition, the map could show the current location of all items within the warehouse (or across multiple warehouses).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a warehouse management system. For instance, individual mobile robots may be configured to monitor their battery charge status. The robots may periodically send information to the warehouse management system indicating the status of their batteries. This information may then be used by the warehouse management system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, warehouse management system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A-2D illustrate several examples of robotic devices that may be included within a robotic warehouse fleet. Other robotic devices which vary in form from those illustrated here as well as other types of robotic devices may also be included.

Figure 2A:
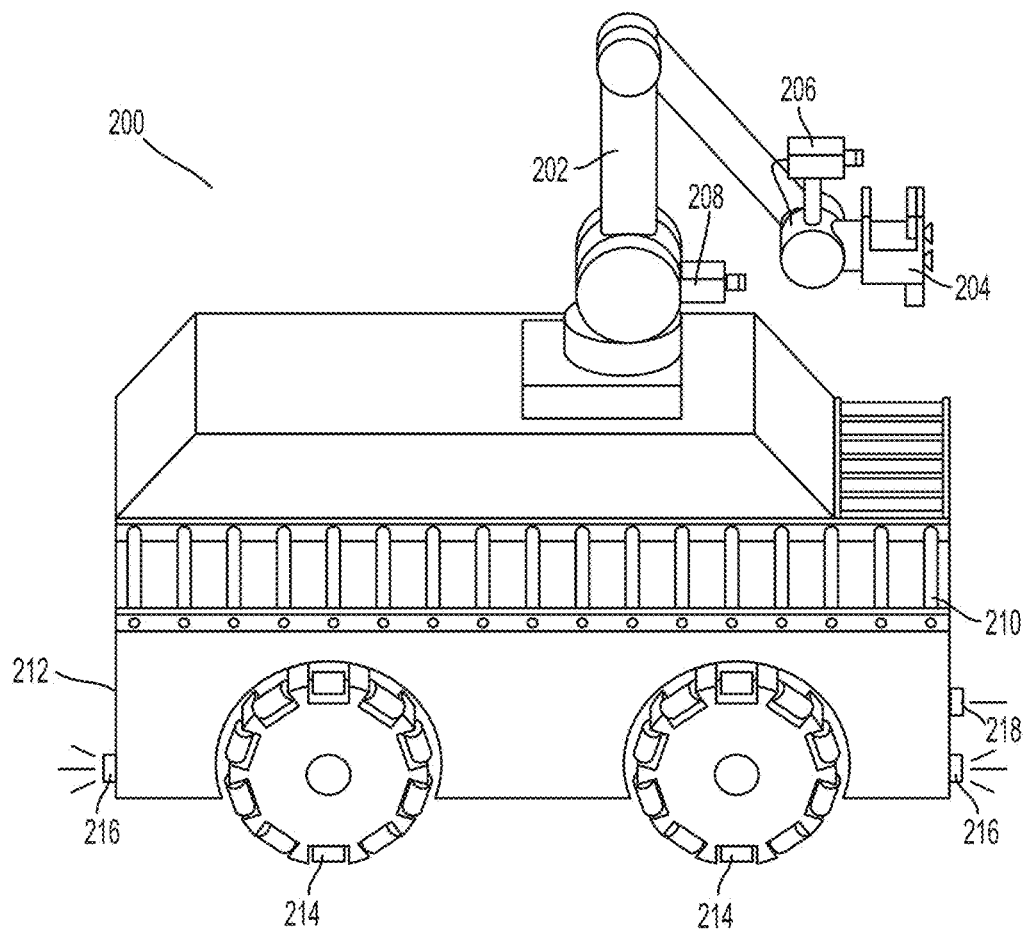
FIG. 2A illustrates a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wrap-around front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a navigation sensors 216, safety sensor 218, and one or more sensors coupled to a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
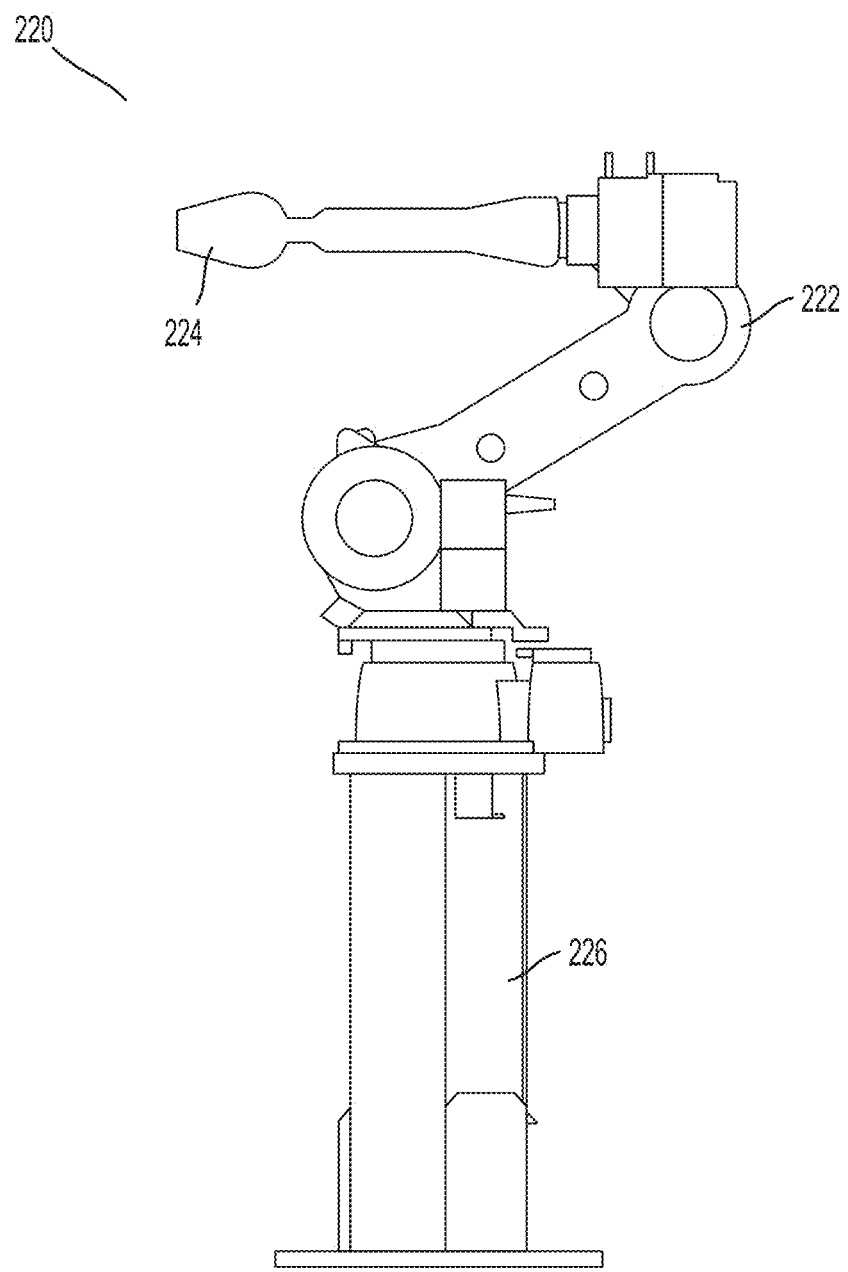
FIG. 2B illustrates a robotic arm on a pedestal, according to an example embodiment.

FIG. 2B illustrates a robotic arm on a pedestal, according to an example embodiment. More specifically, pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be coupled to a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In additional examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
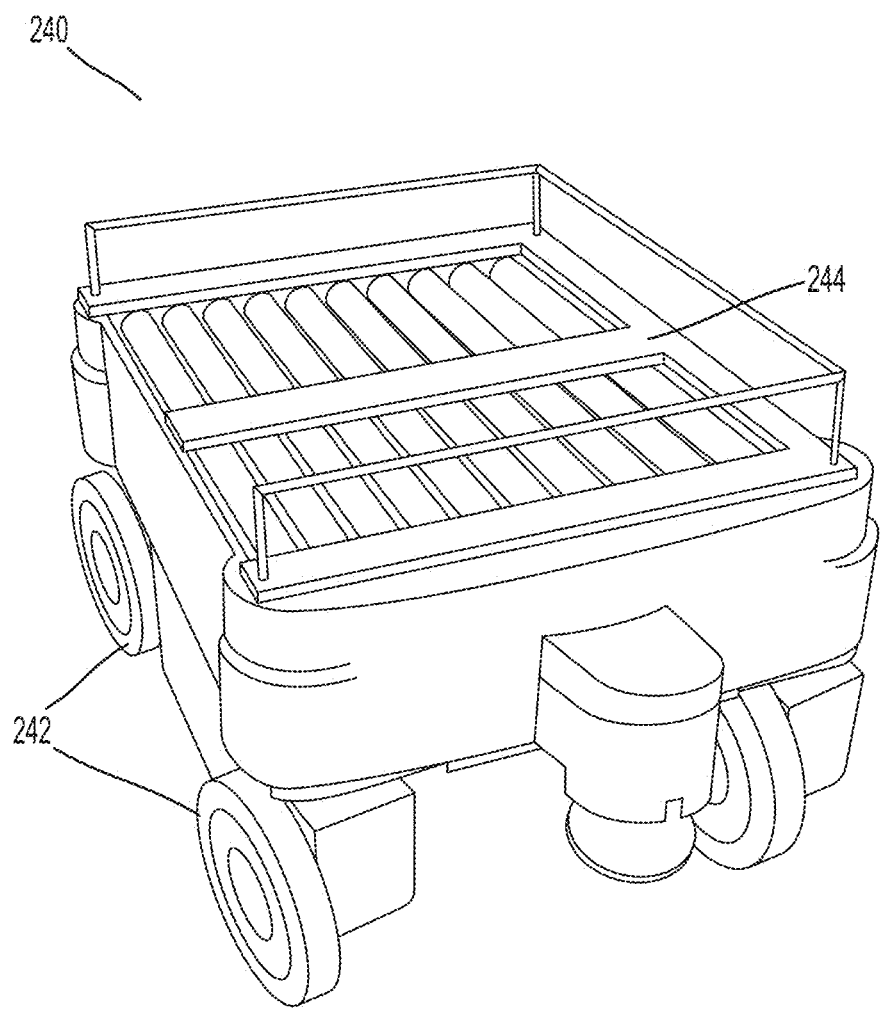
FIG. 2C illustrates an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
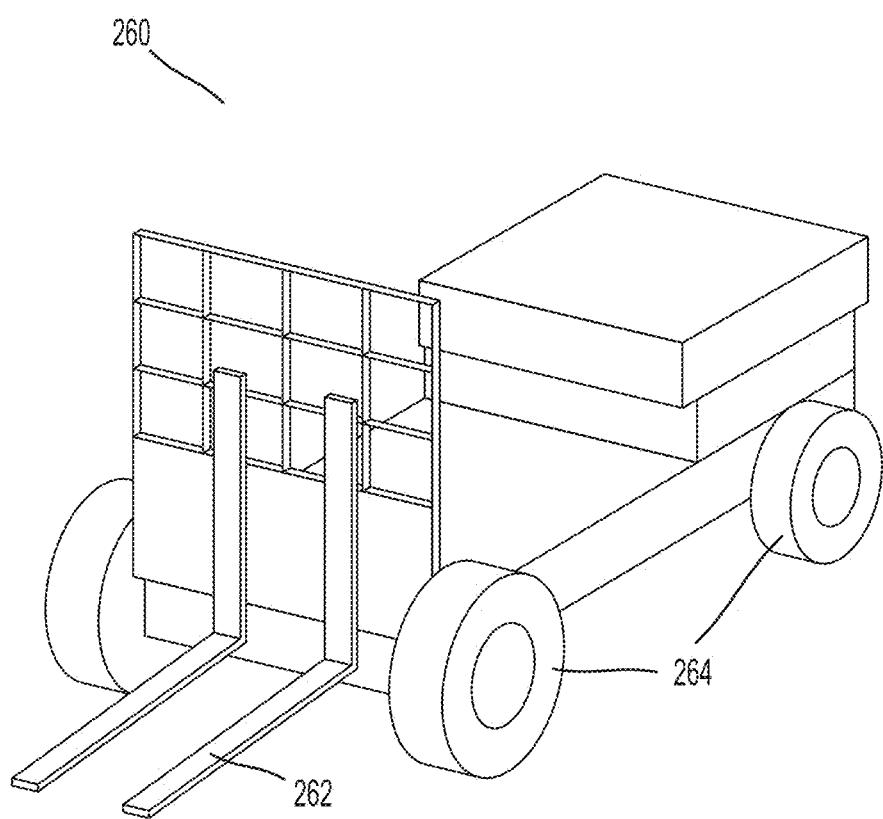
FIG. 2D illustrates an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

Figure 3:
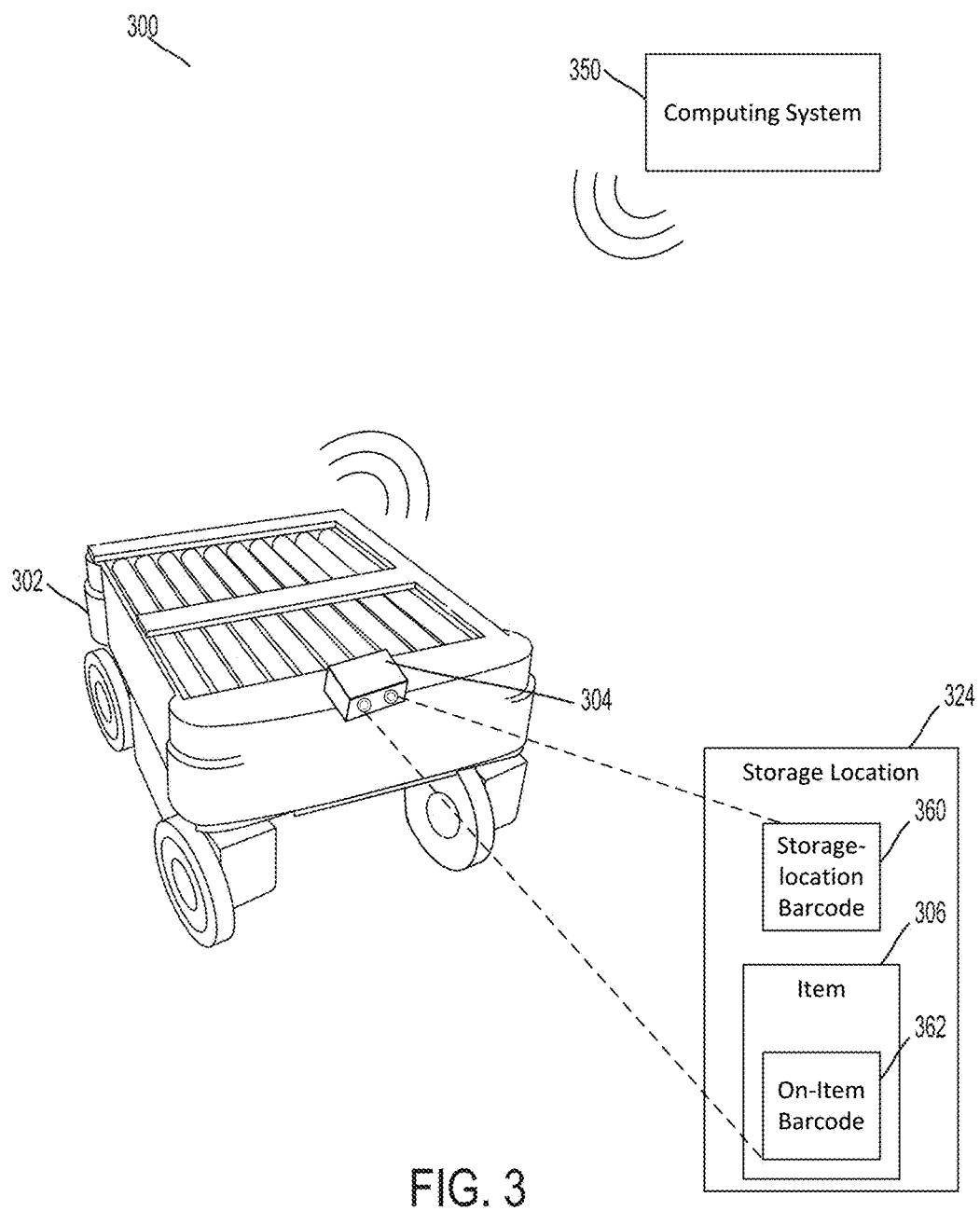
FIG. 3 illustrates a system, according to an example implementation.

FIG. 3 illustrates a system 300, according to an example implementation. System 300 includes a computing system 350 implementing a WMS (e.g., the WMS 150) and a robotic device 302 deployed in a warehouse environment. The warehouse environment can include a plurality of inventory items stored at a plurality of storage locations in the warehouse. The robotic device 302 may be an AGV, or may take the form of one or more other robotic devices such as those shown in FIGS. 2A-D. Other forms are possible as well.

The warehouse environment can include one or more of the mobile components 110 and/or the fixed components 120 described above in connection with the example warehouse environment of FIG. 1A and the example robotic warehouse fleet 100 of FIG. 1B. For ease of illustration and description, FIG. 3 depicts a representative inventory item 306 stored at a representative storage location 324; however, the warehouse environment may include a plurality of inventory items 306 stored at a plurality of storage locations 324. These inventory items 306 may be arranged and stored on shelves of storage racks organized into aisles within the warehouse environment. This organization may allow the robotic device 302 to navigate through the aisles to access one or more inventory items 306. Additionally or alternatively, the storage locations 324 may include designated locations on the warehouse floor where items 306 may be stored.

As shown in FIG. 3, the storage location 324 has a storage-location barcode 360 that identifies the storage location 324 and the item 306 has an on-item barcode 362 that identifies the item 306. The storage-location barcode 360 and the on-item barcode 362 each can be a one-dimensional barcode (i.e., a linear barcode) and/or a two-dimensional barcode (i.e., a matrix barcode). The on-item barcode 362 can be placed on the outside of the inventory item 306, such as on the packaging or wrapping. Similarly, the storage-location barcode 360 can positioned so as to be visible for inspection from an aisle in the warehouse. For example, the storage-location barcode 360 can be provided on a label coupled to an exterior surface of a storage rack facing an aisle.

The computing system 350 can store information related to the items 306, the storage locations 324, and the robotic devices 302. In particular, the computing system 350 can store information relating to the identity and physical location in the warehouse of the items 306 and the storage locations 324. This information can be stored in the computing system 350 to facilitating tracking inventory items in the warehouse. The computing system 350 can also use this information to instruct the robotic devices 302 to carry out one or more functions, such as fulfilling an order for a customer.

In an example, the computing system 350 can store and access a database that specifies for each storage location 324 in the warehouse, on a per storage location 324 basis, a record of associated data entries for different storage-location barcodes 360, items 306, on-item barcodes 362, and/or physical warehouse locations. For instance, each record can be a row in a table having columns for fields that include indications of at least the storage-location barcode 360 of the storage location 324, the on-item barcode(s) 362 of the item(s) 306 stored at the storage location 324, and the physical location of the storage location 324 in the warehouse. The physical location of the storage location 324 in the warehouse can be represented by, for example, coordinates of the storage location 324 on a coordinate system spatially mapped to the physical space of the warehouse as described above. Thus, with knowledge of the storage-location barcode 360 and/or the on-item barcode 362, the computing system 350 can identify a record in the database from which a corresponding physical location in the warehouse can be determined.

In line with the discussion above, the data stored in the database can be, at least in part, based on inventory tracking operations carried out by robotic devices 302 and/or operators in the warehouse. For example, when an item 302 is deposited at a particular storage location 324, the robotic device 302 or operator can scan the storage-location barcode 360 at the storage location 324 and the on-item barcode 362 on the item 306. The robotic device 302 and/or operator can then transmit the storage-location barcode 360 and the on-item barcode 362 to the computing system 350, which updates the database to indicate that the item 306 was deposited at the storage location 324.

The computing system 350 may additionally store other information for the item 306 such as, for example, the contents of the item, size, weight, color, history associated with the item, handling instructions, and various other characteristics. The computing system 350 may also store additional information about the storage location 324 such as, for example, the type of storage location (e.g., storage rack or floor space), size of the storage space, and the shape of the storage space. This information may be used to build a virtual warehouse that can be used to keep track of the inventory items 306.

As shown in FIG. 3, computing system 350 may be separate from robotic device 302 (i.e., computing system 350 is remotely located relative to robotic device 302), and may be communicatively coupled to robotic device 302 via a wireless connection. Alternatively, in some examples computing system 350 may be coupled to robotic device 302 via a wired connection, and/or may be a component of robotic device 302 itself (i.e., at least a portion of the computing system 350 is on the robotic device 302). In other examples, computing system 350 may include components located in both robotic device 302 and elsewhere, such that performance of the functions of computing device 350 described herein may be done by a component on robotic device 302, a central computing device, or a combination thereof. In still other examples, computing system 350 may be distributed across two or more robotic devices, such that a peer-to-peer network of robotic devices including a computing system is formed.

As also shown in FIG. 3, the robotic device 302 includes a camera 304, which can capture image data. The captured image data can be used for one or more purposes discussed herein, such as navigation, obstacle avoidance, item identification, item manipulation, and robotic device identification. The camera 304 can include one or more optical sensors configured to capture visual information, such as size, shape, depth, texture, and color, for example. In one embodiment, camera 304 can include a stereo pair of lenses, which can operate in tandem to provide a 3D image of the field of view of the camera. The camera 304 can also or alternatively include one or more lenses, RADAR sensors, LIDAR sensors, 3D sensors, or other type of sensing equipment capable of capturing a storage-location barcode 360 and/or an on-item barcode 362. More or fewer lenses may be used as well.

The camera 304 can be coupled to robotic device 302 such that it can be positioned to have a plurality of different fields of view. For example, camera 304 can be coupled to the front of robotic device 302 (i.e., such that the camera is forward facing when robotic device 302 moves, as shown in FIG. 3). The camera 304 can also be coupled such that it can swivel, turn from side to side and/or up and down, or change position on robotic device 302. The camera 304 can be coupled to a controllable robotic arm, or on a track such that it can move positions on the robotic device. In this way, camera 304 can be positioned to have multiple different fields of view.

Figure 4:
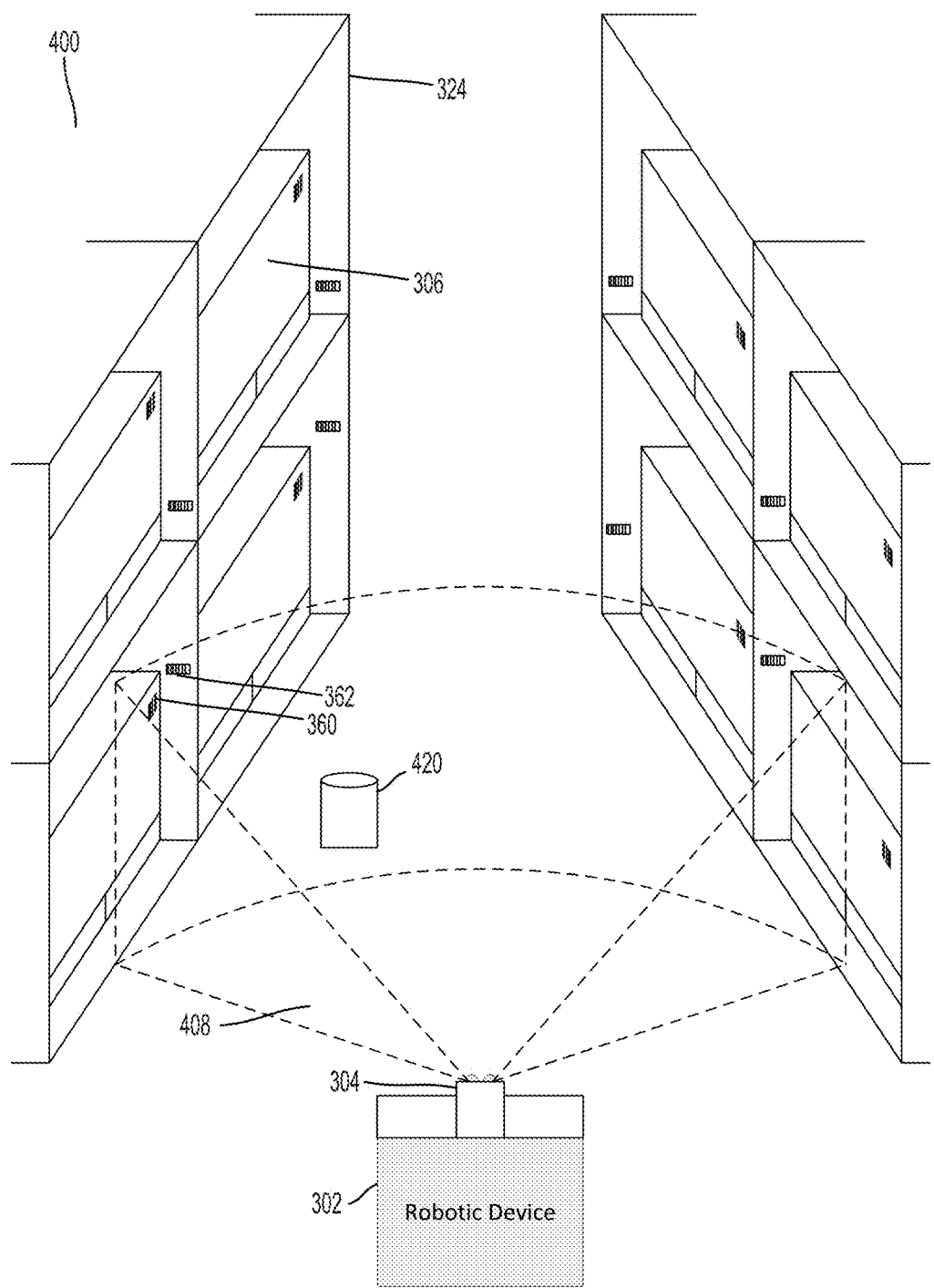
FIG. 4 illustrates a warehouse aisle according to an example implementation.
Figure 5:
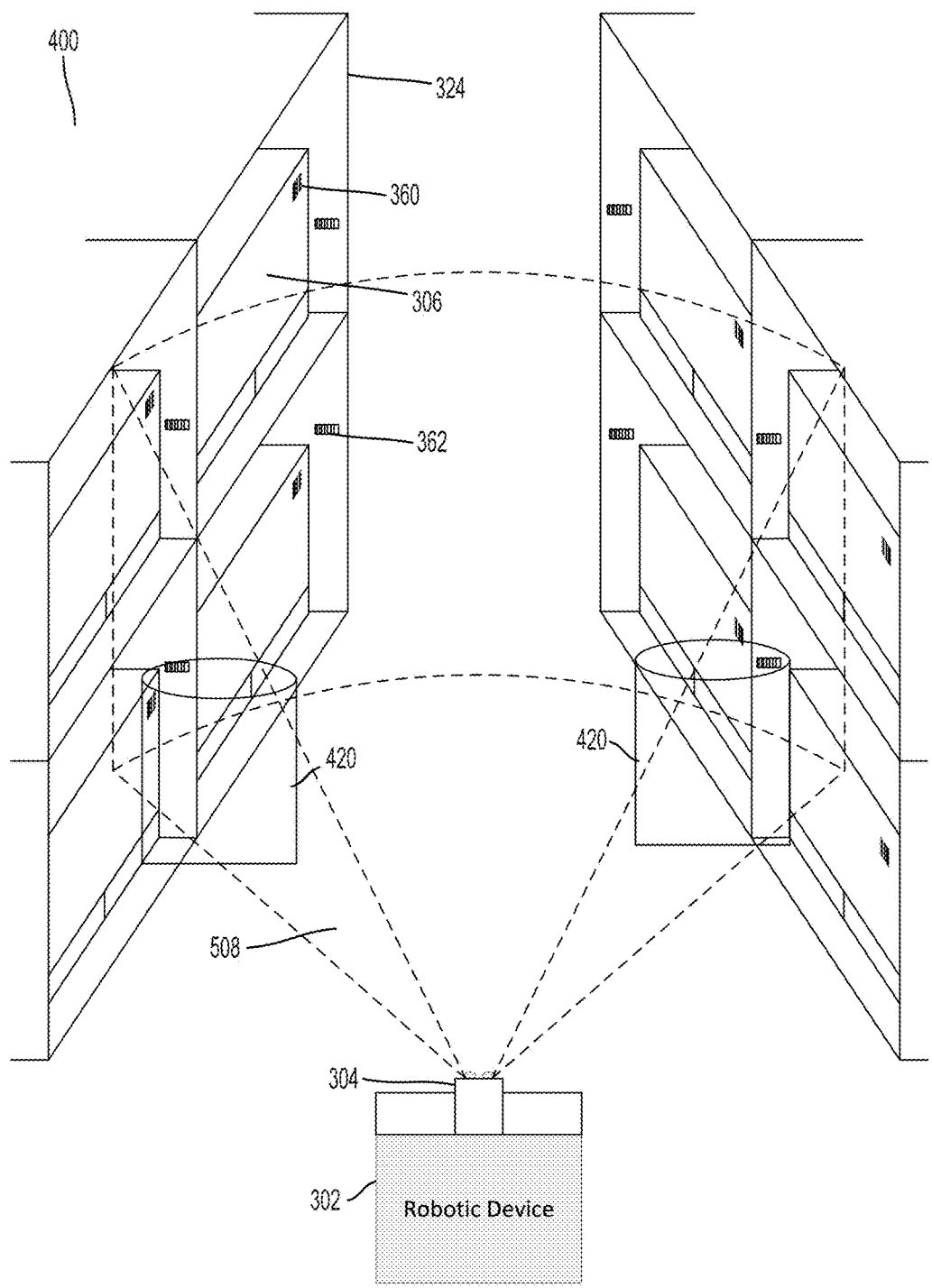
FIG. 5 illustrates the warehouse aisle of FIG. 4 according to another example implementation.

The field of view of camera 304 can depend on the position and orientation of camera 304, which can be controlled by computing system 350. FIGS. 4-5, discussed in further detail below, illustrate example fields of view 408, 508 of a camera 304. As such, the field of view may include one or more boundaries. Image data captured by the camera 304 can thus be limited by the boundaries of the field of view. While the robotic device 302 is operating in the warehouse, one or more storage-location barcodes 360 and/or one or more on-item barcodes 362 may be in the field of view of the camera 304 and, thus, the camera 304 may capture image data including the one or more storage-location barcodes 360 and/or the one or more on-item barcodes 362.

In an example, the computing system 350 can receive the captured image data from the camera 304 of the robotic device 302. Responsive to the computing system 350 receiving the captured image data, the computing system 350 can analyze the received image data. If the captured image data includes one or more storage-location barcodes 360 and/or one or more on-item barcodes 362, the computing system 350 can detect the one or more storage-location barcodes 360 and/or the one or more on-item barcodes 362. In some examples, detecting the barcode(s) 360, 362 can include the computing system 350 scanning or searching the image data for the storage-location barcodes 360 and/or the on-item barcodes 362.

Responsive to the computing system 350 detecting the barcode(s) 360, 362, the computing system 350 can extract or "read" the detected barcode(s) 360, 362 and identify the storage location(s) 324 and/or item(s) 306 corresponding to the detected barcode(s) 360, 362. For example, the computing system 350 can access the database to identify the record containing information relating to the detected barcode(s) 360, 362 and then determine, from the identified record, the physical location of the detected barcode(s) 360, 362 in the warehouse. For instance, if the computing system 350 detects a storage-location barcode 360, the computing system 350 can determine the physical location in the warehouse that corresponds to the storage location associated with the storage-location barcode 360 in the database. Similarly, if the computing system 350 detects an on-item barcode 362, the computing system 350 can determine a physical location in the warehouse based on the association between the on-item barcode 362 with a particular storage location 324 in the database, which in turn is associated with the physical location in the warehouse.

In an example, the computing system 350 can determine that the physical location of the robotic device 302 is the determined physical location of the detected barcode(s) 360, 362. In another example, the computing system 350 can further analyze the captured image data to determine a distance and/or orientation of the robotic device 302 relative to the determined physical location of the detected barcode(s) 360, 362. For example, the computing system 350 may analyze the captured image data to determine a size and/or shape of the detected barcode(s) 360, 362 and then compare the determined size and/or shape to a reference size and/or a reference shape stored by the computing system 350 for the detected barcode(s) 360, 362. Based on the comparison, the computing system 350 can determine the distance and/or orientation of the robotic device 302 relative to the detected barcode(s) 360, 362. The computing system 350 can thus determine the location of the robotic device 302 based on the location of the detected barcode(s) 360, 362 and the determined distance and/or orientation relative to the location of the detected barcode(s) 360, 362.

As another example, the computing system 350 can determine a distance and/or orientation of the robotic device 302 relative to the determined physical location based on image analysis of an item 306 and/or a storage location 324 infrastructure to which the detected barcode(s) 360, 362 are coupled. As noted above, the computing system 350 can store information for the item 306 such as the size, weight, color, and various other characteristics of the item 306 and/or the computing system 350 can store information for the storage location 324 such as the type of storage location (e.g., storage rack or floor space), size of the storage space, and the shape of the storage space. Based on the detected barcode(s) 360, 362, the computing system 350 can identify this additional information for item 306 and/or storage location 324 infrastructure. The computing system 350 can then analyze the captured image data based on the identified information to determine the distance and/or orientation of the robotic device 302 relative to the physical location determined by the computing system 350 based on the detected barcode(s) 360, 362.

Within examples, the computing system 350 can thus determine the location of the robotic device 302 based on the location of the detected barcode(s) 360, 362 and a determined distance and/or orientation relative to the location of the detected barcode(s) 360, 362. This may be beneficial in that the computing system 350 may be able to accurately determine the location of the robotic device 302 without having to provide engineering-surveyed locations for barcode(s) 360, 362, which are generally required in conventional systems that use fiducial markers for triangulation. However, the locations of the barcode(s) 360, 362 can be based on engineering-surveyed locations in some examples of the present disclosure.

Responsive to the computing system 350 determining the physical location of the robotic device 302, the computing system 350 can carry out one or more actions. For example, based on the determined location of the robotic device 302, the computing system 350 can determine navigation instructions for the robotic device 302. To do so, the computing system 350 can determine a target inventory item that is located in a target location, and then generate navigation instructions to move the robotic device 302 from the determined location to the target location. The computing system 350 can retrieve the target location of the target item, for instance, from the database. The computing system 350 can further generate the navigation instructions based on the mapping of the fixed components 120, as described above, so as to generate a path for the robotic device 302 to travel from the determined location to the target location.

Once robotic device 302 is positioned at the target location, the robotic device 302 can use the camera 304 to capture additional image data. The computing system 350 can receive and analyze the additional image data to detect a target barcode, which can be the on-item barcode that identifies the target inventory item. Responsive to the computing system 350 detecting the target barcode, the computing system 350 can determine that the robotic device 302 successfully navigated to the target location. In this way, the robotic device 302 can use barcodes 360, 362 to navigate to a target item and then confirm successful navigation.

In examples, the robotic device 302 can continue to capture image data containing additional storage-location barcode(s) 360 and/or on-item barcode(s) 362 while the robotic device 302 travels from an initial location to the target location. Receiving such captured image data, the computing system 350 can detect the additional barcode(s) 360, 362 to track the progress of the robotic device 302 towards the target location.

By tracking the location of the robotic device 302 within the warehouse, the computing system 350 can better allocate resources to accomplishing warehouse operations. For instance, the computing system 350 can decide to alter navigation instructions provided to the robotic device 302 based on changed conditions in the warehouse. As an example, if a new order comes in for an additional target item, the computing system 350 can update the navigation instructions previously provided to the robotic device 302 to cause the robotic device 302 to perform an operation on the additional target item before or after navigating to an initial target item. As another example, if the computing system 350 becomes aware of a problem along the path specified by previously assigned navigation instructions, the computing system 350 can update the navigation instructions to reroute the robotic device 350 along a different path that avoids the problem. Other examples are also possible.

As noted above, the robotic device 302 can use the camera 304 for additional functions as well. For example, the camera 304 can be used to facilitate the robotic device 302 manipulating an item 306. For instance, the robotic device 302 and/or the computing system 350 can analyze the captured image data to sense the item 306 and, based on the analyzed image data, actuate a gripper, forklift, or other implement to manipulate the item 306 (e.g., deposit or remove the item 306 from the storage location 324).

Additionally, for example, the camera 304 may be positioned such that the field of view includes the ground around and in front of robotic device 302. In this position, image data captured by camera 304 may include objects and/or obstacles that obstruct the forward movement of robotic device 302. The computing system 350 can analyze the captured image data to detect and avoid obstructions to movement of the robotic device 302.

FIGS. 4-5 illustrate example positions for the camera 304 as the robotic device 302 is traveling in an example warehouse aisle 400. As shown in FIGS. 4-5, the aisle 400 includes one or more storage locations 324 in the form of storage racks having shelves, which may be multiple levels in height and may have one or more inventory items 306 stored thereon. Each inventory item 306 includes a respective on-item barcode 362, which may be used to differentiate the inventory items from each other and identify which item 306 is which. Similarly, each storage location 324 includes a respective storage-location barcode 360, which may be used to differentiate storage locations from each other and identify which storage location 324 is which.

As shown in FIG. 4, the camera 304 of the robotic device 302 has a first field of view 408. The field of view 408 can change based on the position and orientation of the camera 304. While the robotic device 302 is operating in the aisle 400, the camera 304 may capture image data including one or more storage-location barcodes 360 and/or one or more on-item barcodes 362 located within the field of view 408. As described above, the computing system 350 can detect the barcode(s) 360, 362 in the captured image data, determine the location of the robotic device 302 based on detected barcode(s) 360, 362, and then generate navigation instructions based on the determined location of the robotic device 302.

In FIG. 4, the camera 304 is angled downward in a first position to capture image data with a first field of view 408 including the ground in front of robotic device 302. The camera 304 in this first position may capture image data including obstacle 420. In response, the computing system 350 can generate navigation instructions that cause robotic device 302 to change its movement direction to avoid the obstacle 420.

In FIG. 5, two obstacles 420 in the aisle 400 obscure the storage-location barcodes 360 and on-item barcodes 362 on the first shelves from the camera's 304 field of view 408. In examples, the camera 304 can be actively steered to obtain image data including storage-location barcode(s) 360 and/or on-item barcode(s) 362. For example, in FIG. 5, the camera 304 of robotic device 302 is in a second position, angled upward as indicated by a second field of view 508. The second field of view 508 depicted in FIG. 5 is thus higher than the first field of view 408 depicted in FIG. 4. The field of view 508 may include storage-location barcode(s) 360 corresponding to storage locations 324 on the second level of shelves and on-item barcode(s) 362 corresponding to inventory items 306 located on the second level of shelves. However, the camera 304 in the second position may have reduced visibility of the ground in front of robotic device 302, or may not be able to see the ground at all. As such, the positioning and resulting field of view of camera 304 may include a trade-off between (i) capturing the ground or obstacles for obstacle avoidance purposes and (ii) capturing storage-location barcode(s) 360 and/or on-item barcode(s) 362 for navigation or location tracking purposes.

With this trade-off in mind, examples can include determining the position of the camera 304 based on a consideration of the need for location information and the need for safe and accurate navigation of a robotic device. This may involve weighing the value or importance of information that could be gained by using the camera 304 to capture storage-location barcode(s) 360 and/or on-item barcode(s) 362 against the expected decrease in capability of the robotic device 302 to detect obstacles 420 in its path or otherwise safely navigate. In some instances, if an obstacle obstructs the field of view of a camera 304, the camera 304 on the robotic device 302 may be angled upwards or sideways in order to capture storage-location barcode(s) 360 and/or on-item barcode(s) 362 at elevated positions. But this information may come at a cost, because the camera may no longer be able to see obstacles 420 on the ground as easily. This trade-off may be beneficial, especially where the location information gained by angling the camera 304 upward or sideways is valuable and the likelihood of running into an obstacle 420 is small.

In some examples, the position of camera 304 may change dynamically. For instance, while robotic device 302 is carrying out navigation instructions determined based on image data captured when camera 304 in a first position, camera 304 may be put in a second position to capture storage-location and/or on-item barcode(s) 360, 362. The camera 304 can initially be angled downward as shown in FIG. 4, and the computing system 350 may determine that robotic device 302 must move right one foot to avoid obstacle 420, and then that the path forward is clear for 20 feet. The robotic device 302 may then proceed to execute these navigation instructions. But before or during the execution of these navigation instructions, camera 304 may be put in a second position, such as the upward angle shown in FIG. 5, which may include storage-location barcodes 360 and/or on-item barcodes 362 that would not be visible for the camera 304 in the first position. Alternatively, the camera 304 may scan back and forth, up and down, or otherwise change its field of view during movement of robotic device 302, or while robotic device 302 is stationary.

FIGS. 6-9 show flowcharts of example methods according to example embodiments. The methods may be carried out by any of the devices or systems described herein, such as robotic devices shown in FIGS. 2A-2D, 3, 4, and 5, and/or computing systems described herein.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIGS. 6-9. Where used, program code can be stored on any type of computer-readable medium, for example, such as a storage device including a disk or hard drive.

Method

In addition, each block of the flowchart shown in FIGS. 6-9 may represent circuitry that is wired to perform the specific logical functions in the process. Unless specifically indicated, functions in the flowcharts shown in FIGS. 6-9 may be executed out of order from that shown or discussed, including substantially concurrent execution of separately described functions, or even in reverse order in some examples, depending on the functionality involved, so long as the overall functionality of the described method is maintained.

Figure 6:
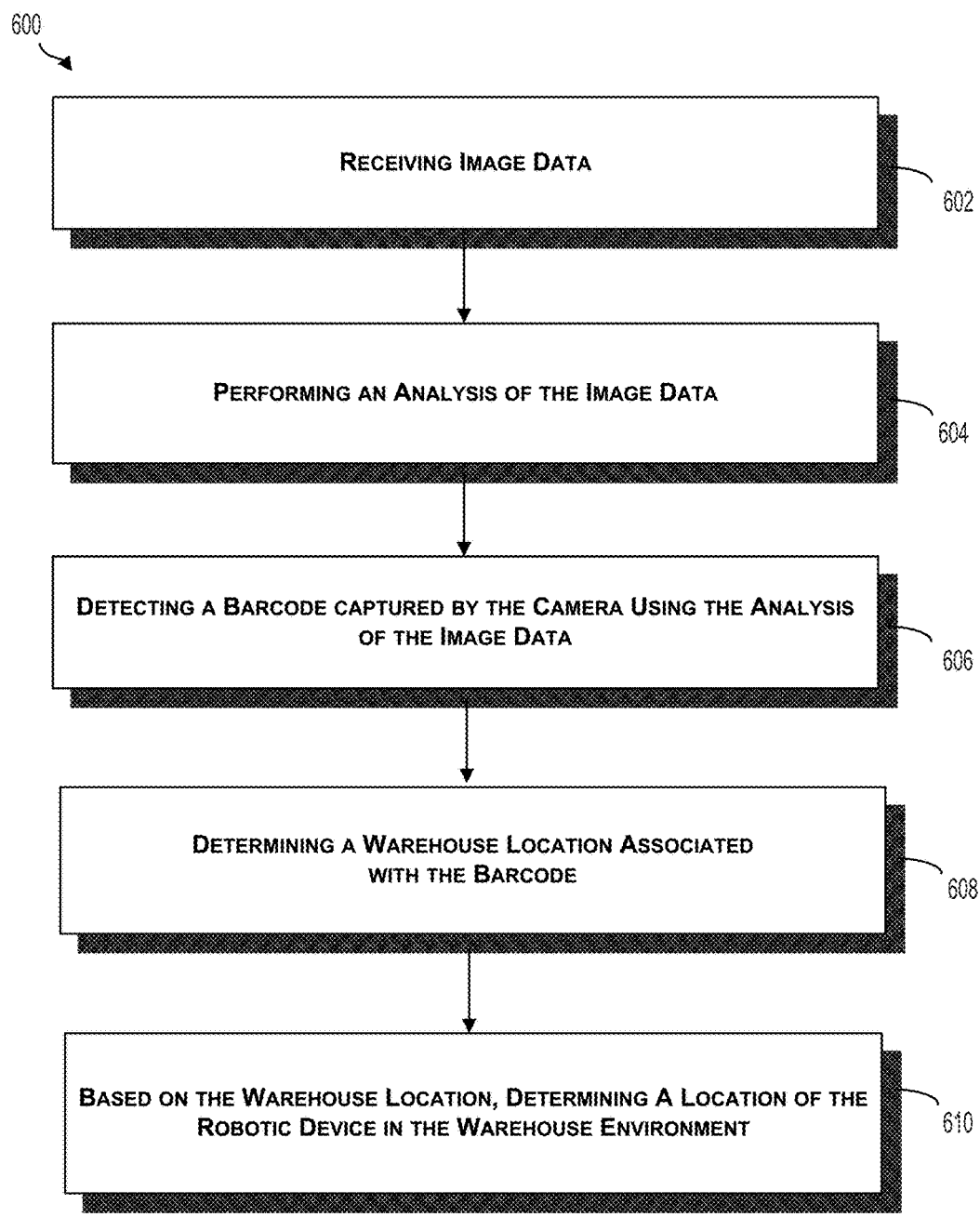
FIG. 6 illustrates a flowchart of an example method, according to an example implementation.

At block 602 of FIG. 6, the method 600 can include receiving image data, which may be captured by a camera coupled to a robotic device. As described above, the robotic device is deployed in a warehouse environment, which includes a plurality of inventory items stored at a plurality of storage locations in the warehouse environment. Each inventory item has an on-item barcode that identifies the inventory item in a WMS, each storage location has a storage-location barcode that identifies the storage location in the WMS, each on-item barcode is associated with a respective one of the plurality of storage-location barcodes in the WMS, and each storage location can be associated with a respective warehouse location in the WMS. A first on-item barcode for a first inventory item of the plurality of inventory items is associated in the WMS with a first storage-location barcode for a first storage location of the plurality of storage locations.

At block 604, the method 600 includes performing an analysis of the image data. At block 606, the method 600 further includes detecting a barcode captured by the camera using the analysis of the image data at block 604. The barcode detected using the analysis at block 606 includes one or both of the first on-item barcode and the first storage-location barcode.

At block 608, the method 600 further includes determining a warehouse location associated with the detected barcode in the WMS. As an example, if the barcode detected at block 606 is the first storage-location barcode, then determining the warehouse location at block 608 can include (i) determining, from among the plurality of storage locations, the first storage location corresponds to the first storage-location barcode, and (ii) determining, from the WMS, the warehouse location that is associated with the first storage location. As another example, if the barcode detected at block 606 is the first on-item barcode, then determining the warehouse location at block 608 can include (i) determining, from among the plurality of storage-location barcodes, the first storage-location barcode is associated with the first on-item barcode in the WMS, (ii) determining, from among the plurality of storage locations, the first storage location is associated with the first storage-location barcode in the WMS, and (iii) determining, from the WMS, the warehouse location that is associated with the first storage location in the WMS.

At block 610, based on the determined warehouse location associated with the detected barcode, the method 600 includes determining a location of the robotic device within the warehouse environment. As an example, determining the location of the robotic device at block 610 can include determining that the warehouse location determined at block 608 is the location of the robotic device. As another example, determining the location of the robotic device at block 610 can include (i) determining, from the captured image data, one or both of a size and a shape of the detected barcode, (ii) comparing the determined one or both of the size and the shape of the detected barcode to one or both of a reference size and a reference shape, (iii) based on the comparison, determining one or both of a distance and an orientation of the robotic device relative to the determined warehouse location of the detected barcode, and (iv) determining the location of the robotic device based on (a) the determined warehouse location of the detected barcode and (b) the determined one or both of the distance and the orientation of the robotic device relative to the determined warehouse location of the detected barcode.

Figure 7:
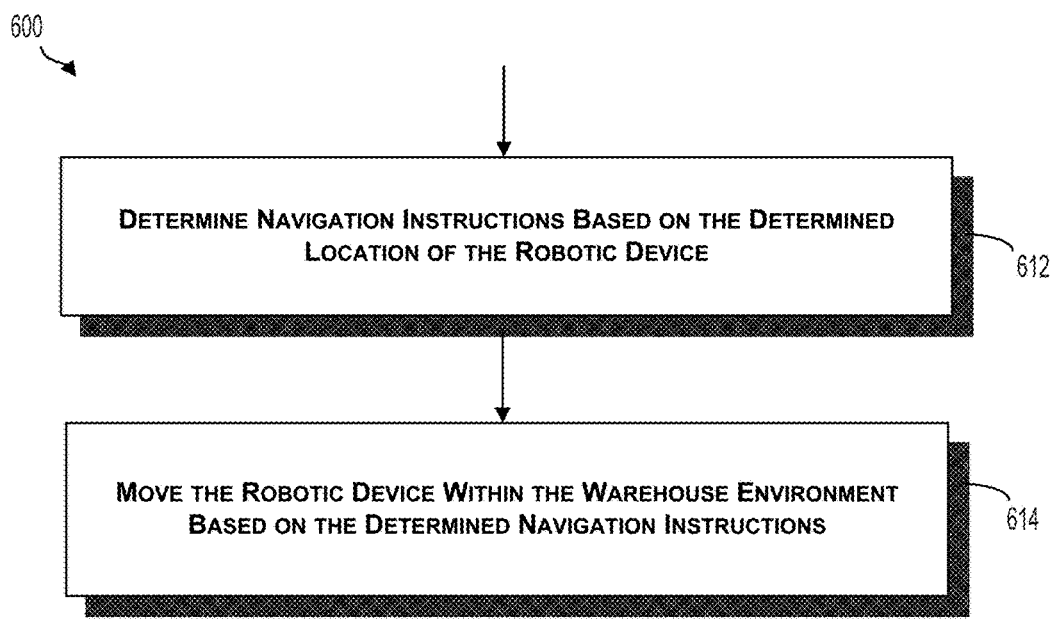
FIG. 7 illustrates a flowchart of another example method, according to an example implementation.

As shown in FIG. 7, the method 600 can further include, at block 612, determining navigation instructions based on the determined location of the robotic device. For example, determining the navigation instructions can include determining a target inventory item at a target location, and generating navigation instructions to move the robotic device from the determined location to the target location. As also shown in FIG. 7, at block 614, the method can include moving the robotic device within the warehouse environment based on the navigation instructions determined at block 612.

Figure 8:
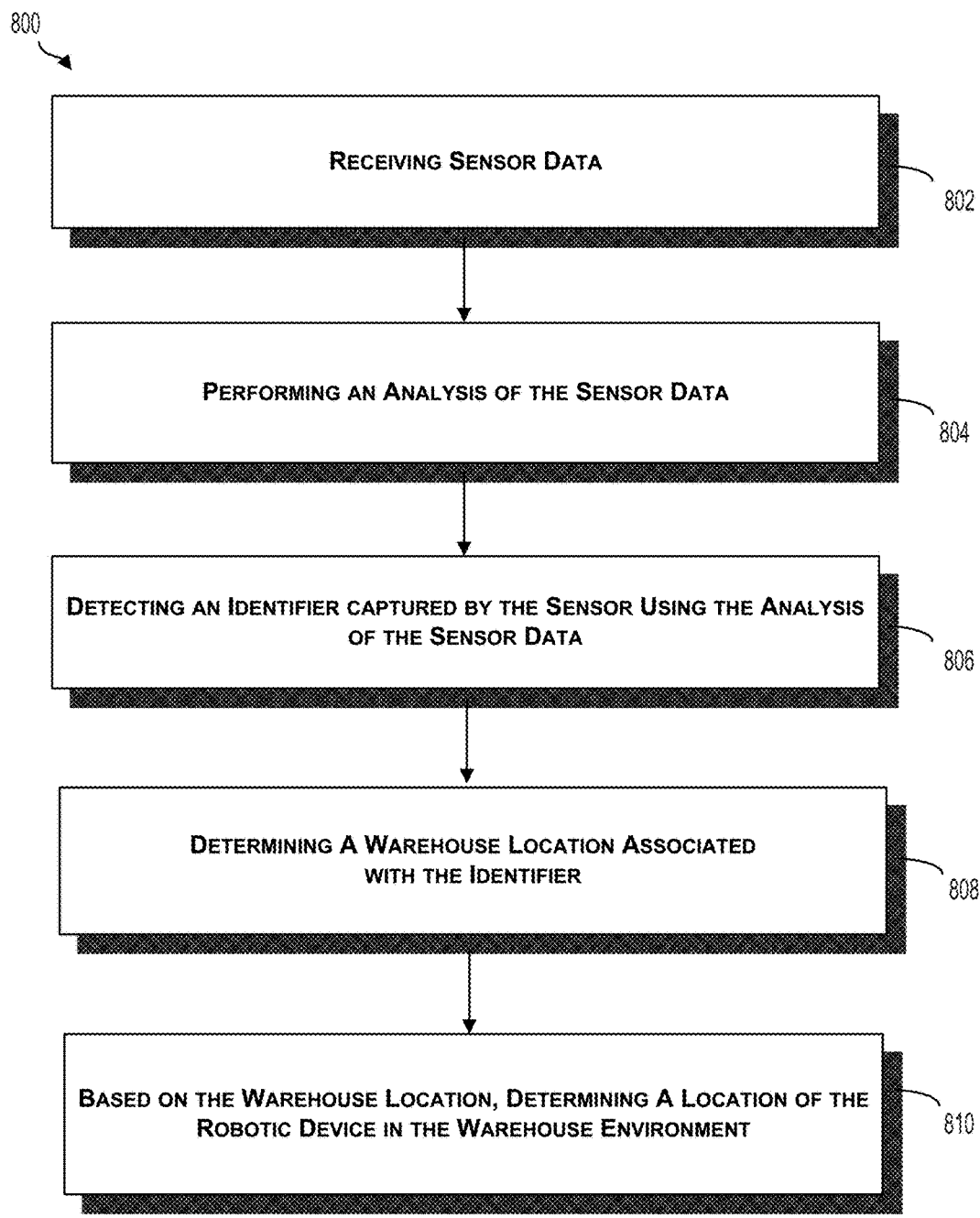
FIG. 8 illustrates a flowchart of another example method, according to an example implementation.

FIG. 8 shows a flowchart of another example method 800 according to an example embodiment. At block 802 of FIG. 8, the method 800 can include receiving sensor data, which may be captured by a sensor coupled to a robotic device. As described above, the robotic device is deployed in a warehouse environment, which includes a plurality of inventory items stored at a plurality of storage locations in the warehouse environment. Each inventory item has an on-item identifier that identifies the inventory item in a WMS, and each storage location has a storage-location identifier that identifies the storage location in the WMS. A first on-item identifier for a first inventory item of the plurality of inventory items is associated in the WMS with a first storage-location identifier for a first storage location of the plurality of storage locations.

At block 804, the method 800 includes performing an analysis of the sensor data. At block 806, the method 800 includes detecting an identifier using the analysis of the sensor data. The identifier detected at block 806 includes one or both of the first on-item identifier and the first storage-location identifier.

At block 808, the method 800 further includes determining a warehouse location associated with the identifier in the WMS. As an example, if the identifier detected at block 806 is the first storage-location identifier, then determining the warehouse location at block 808 can include (i) determining, from among the plurality of storage locations, the first storage location corresponds to the first storage-location identifier, and (ii) determining, from the WMS, the warehouse location that is associated with the first storage location. As another example, if the identifier detected at block 806 is the first on-item identifier, then determining the warehouse location at block 808 can include (i) determining, from among the plurality of storage-location identifiers, the first storage-location identifier is associated with the first on-item identifier in the WMS, (ii) determining, from among the plurality of storage locations, the first storage location is associated with the first storage-location identifier in the WMS, and (iii) determining, from the WMS, the warehouse location that is associated with the first storage location in the WMS.

At block 810, based on the warehouse location determined at block 808, the method 800 includes determining a location of the robotic device within the warehouse environment. As an example, determining the location of the robotic device can include determining that the warehouse location determined at block 808 is the location of the robotic device. As another example, determining the location of the robotic device at block 810 can include (i) determining, from the captured sensor data, one or both of a size and a shape of the detected identifier, (ii) comparing the determined one or both of the size and the shape of the detected identifier to one or both of a reference size and a reference shape, (iii) based on the comparison, determining one or both of a distance and an orientation of the robotic device relative to the determined warehouse location of the detected identifier, and (iv) determining the location of the robotic device based on (a) the determined warehouse location of the detected identifier and (b) the determined one or both of the distance and the orientation of the robotic device relative to the determined warehouse location of the detected identifier.

Figure 9:
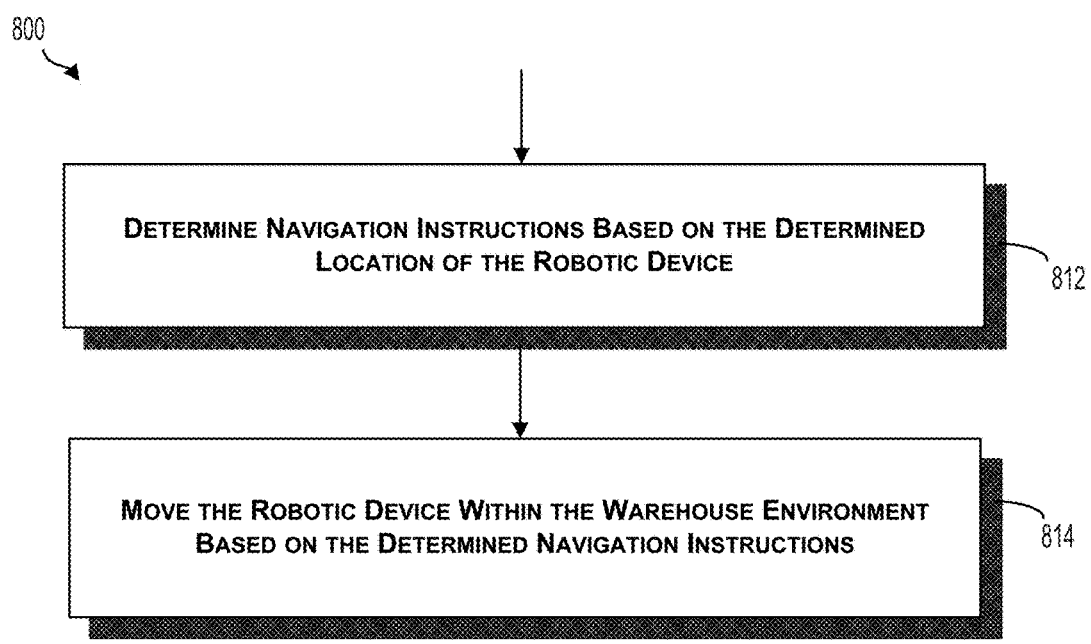
FIG. 9 illustrates a flowchart of another example method, according to an example implementation.

As shown in FIG. 9, the method 800 can further include, at block 812, determining navigation instructions based on the determined location of the robotic device. For example, determining the navigation instructions can include determining a target inventory item at a target location, and generating navigation instructions to move the robotic device from the determined location to the target location. As also shown in FIG. 9, at block 814, the method can include moving the robotic device within the warehouse environment based on the navigation instructions determined at block 812.

III. Example Variations

In some examples, the robotic device can include additional sensors and/or systems to facilitate navigation. For instance, the robotic device can also navigate using a global positioning satellite (GPS) system and/or an odometer in combination with the camera system described above. Additionally, for instance, one or more sensors may be positioned on robotic device such that it can build a full or partial 3D model of its surroundings, which may be used to generate a route or path for movement of robotic device. As another example, the robotic device may move based, at least in part, on commands from the computing system communicatively coupled to robotic device. For instance, one or more sensors positioned within the warehouse environment may transmit data to a computing system (e.g., a warehouse management system), which may then generate a route, path, or other navigation instructions for robotic device 302.

In some examples, the robotic device and/or the computing system can generate timestamp information for image data captured by the camera on the robotic device. The computing device can use the timestamp information for tracking and perhaps estimating the location of the robotic device in the warehouse environment over time.

In some examples, the robotic device can determine a position and/or an orientation of the camera relative to the robotic device at a time that image data is captured. The robotic device can provide an indication of the determined position and/or orientation of the camera to the computing system. The computing system can use such information to, for example, facilitate determining a position and/or orientation of the robotic device in the warehouse environment and/or providing instructions to the robotic device to control the field of view of the camera, among other possibilities.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
receiving sensor data captured by a sensor coupled to a particular one of a plurality of robotic devices,
wherein the plurality of robotic devices are deployed in a warehouse environment,
wherein a plurality of inventory items are stored at a plurality of storage locations in the warehouse environment, the inventory items being moved to the storage locations by the plurality of robotic devices, each inventory item including a respective on-item identifier that identifies the inventory item in a warehouse management system (WMS), each storage location having a respective storage-location identifier that identifies the storage location in the WMS, and
wherein a particular one of the inventory items is stored at a first storage-location at a first time, the on-item identifier of the particular inventory item being associated in the WMS with a first storage-location identifier for the first storage location at the first time, and
the particular inventory item is stored, after a movement in the warehouse environment, at a second storage-location at a second time, the on-item identifier of the particular inventory item being associated in the WMS with a second storage-location identifier for the second storage location at the second time;
responsive to receiving the sensor data, performing an analysis of the sensor data;
detecting the on-item identifier of the particular inventory item captured by the sensor using the analysis of the received sensor data;
determining the first storage location before the movement of the particular inventory item based on the detected on-item identifier of the particular inventory item and the association between the detected on-item identifier of the particular inventory item and the first storage-location identifier in the WMS, or determining the second storage location after the movement of the particular inventory item based on the detected on-item identifier of the particular inventory item and the association between the detected on-item identifier of the particular inventory item and the second storage-location identifier in the WMS; and
based on the first storage location determined before the movement of the particular inventory item, determining a location of the particular robotic device in the warehouse environment relative to the first storage location, or based on the second storage location determined after the movement of the particular inventory item, determining the location of the particular robotic device in the warehouse environment relative to the second storage location.

2. The method of claim 1, wherein the on-item identifier for each inventory item and the storage-location identifier for each storage location are barcodes,
wherein the sensor is a camera, and
wherein the sensor data is image data captured by the camera.

3. The method of claim 1, further comprising:
determining a navigation instruction based on the determined location of the particular robotic device; and
moving the particular robotic device within the warehouse environment based on the navigation instruction.

4. The method of claim 3, wherein determining the navigation instruction comprises:
determining a target inventory item at a target location in the warehouse environment; and
generating the navigation instruction for moving the particular robotic device from the determined location of the robotic device to the target location.

5. The method of claim 4, further comprising:
receiving additional sensor data captured by the sensor coupled to the particular robotic device;
analyzing the received additional sensor data to detect another on-item identifier for the target inventory item; and
responsive to detecting the other on-item identifier, determining that the particular robotic device navigated to the target location.

6. The method of claim 1, wherein determining the location of the particular robotic device comprises:
determining, based on the sensor data, one or both of a size and a shape of the on-item identifier of the particular inventory item;
comparing the determined one or both of the size and the shape of the on-item identifier of the particular inventory item to one or both of a reference size and a reference shape; and
based on the comparison, determining one or both a distance and an orientation of the particular robotic device relative to the on-item identifier of the particular inventory item; and
determining the location of the particular robotic device based on (i) the first storage location determined before the movement of the particular inventory item or the second storage location determined after the movement of the particular inventory item, and (ii) the determined one or both of the distance and the orientation of the particular robotic device relative to the on-item identifier of the particular inventory item.

7. The method of claim 1, wherein the location of the particular robotic device is the first storage location determined before the movement of the particular inventory item or the second storage location determined after the movement of the particular inventory item.

8. The method of claim 1, wherein the WMS comprises one or more components of the particular robotic device.

9. The method of claim 1, wherein the WMS comprises a computing system communicatively coupled to the particular robotic device via a wireless connection.

10. The method of claim 1, wherein the sensor coupled to the particular robotic device is a stereo camera.

11. The method of claim 1 wherein the particular robotic device is an autonomous guided vehicle (AGV).

12. A system comprising:
a plurality of robotic devices deployed in a warehouse environment,
wherein a plurality of inventory items are stored at a plurality of storage locations in the warehouse environment, the inventory items being moved to the storage locations by the plurality of robotic devices, each inventory item including a respective on-item identifier that identifies the inventory item in a warehouse management system (WMS), each storage location having a respective storage-location identifier that identifies the storage location in the WMS, and
wherein a particular one of the inventory items is stored at a first storage-location at a first time, the on-item identifier of the particular inventory item being associated in the WMS with a first storage-location identifier for the first storage location at the first time, and
the particular inventory item is stored, after a movement in the warehouse environment, at a second storage-location at a second time, the on-item identifier of the particular inventory item being associated in the WMS with a second storage-location identifier for the second storage location at the second time;
a sensor coupled to a particular one of the plurality of robotic devices, wherein the sensor is configured to capture sensor data; and
a computing system configured to:
receive the sensor data captured by the sensor,
responsive to receiving the sensor data, perform an analysis of the sensor data,
detect the on-item identifier of the particular inventory item captured by the sensor using the analysis of the sensor data,
determine the first storage location before the movement of the particular inventory item based on the detected on-item identifier of the particular inventory item and the association between the detected on-item identifier of the particular inventory item and the first storage-location identifier in the WMS, or determine the second storage location after the movement of the particular inventory item based on the detected on-item identifier of the particular inventory item and the association between the detected on-item identifier of the particular inventory item and the second storage-location identifier in the WMS, and
based on the warehouse first storage location determined before the movement of the particular inventory item, determine a location of the particular robotic device in the warehouse environment relative to the first storage location, or based on the second storage location determined after the movement of the particular inventory item, determine the location of the particular robotic device in the warehouse environment relative to the second storage location.

13. The system of claim 12, wherein the on-item identifier for each inventory item and the storage-location identifier for each storage location are barcodes,
wherein the sensor is a camera, and
wherein the sensor data is image data captured by the camera.

14. The system of claim 13, wherein the camera is a stereo camera.

15. The system of claim 12, wherein the computing system is further configured to:
determine a navigation instruction based on the determined location of the particular robotic device; and
cause the particular robotic device to move within the warehouse environment based on the navigation instruction.

16. The system of claim 12, wherein, to determine the location of the particular robotic device, the computing system is configured to:
determine, based on the sensor data, one or both of a size and a shape of the on-item identifier of the particular inventory item;
compare the determined one or both of the size or the shape of the on-item identifier of the particular inventory item to one or both of a reference size or a reference shape;
based on the comparison, determine one or both of a distance or an orientation of the particular robotic device relative to the on-item identifier of the particular inventory item; and
determine the location of the robotic device based on (i) the first storage location determined before the movement of the particular inventory item or the second storage location determined after the movement of the particular inventory item, and (ii) the determined one or both of the distance or the orientation of the particular robotic device relative to the on-item identifier of the particular inventory item.

17. The system of claim 12, wherein the particular robotic device comprises at least a portion of the computing system.

18. The system of claim 12, wherein the computing system is located remotely relative to the particular robotic device, and wherein the computing system is communicatively coupled to the particular robotic device via a wireless connection.

19. A robotic device comprising:
a sensor configured to capture sensor data in a warehouse environment,
wherein a plurality of inventory items are stored at a plurality of storage locations in the warehouse environment, the inventory items being moved to the storage locations by a plurality of robotic devices, each inventory item including a respective on-item identifier that identifies the inventory item in a warehouse management system (WMS), each storage location having a respective storage-location identifier that identifies the storage location in the WMS, and
wherein a particular one of the inventory items is stored at a first storage-location at a first time, the on-item identifier of the particular inventory item being associated in the WMS with a first storage-location identifier for the first storage location at the first time, and
the particular inventory item is stored, after a movement in the warehouse environment, at a second storage-location at a second time, the on-item identifier of the particular inventory item being associated in the WMS with a second storage-location identifier for the second storage location at the second time; and
a computing system configured to:
receive the sensor data captured by the sensor,
responsive to receiving the sensor data, perform an analysis of the sensor data, detect the on-item identifier of the particular inventory item captured by the sensor using the analysis of the sensor data, determine the first storage location before the movement of the particular inventory item based on the detected on-item identifier of the particular inventory item and the association between the detected on-item identifier of the particular inventory item and the first storage-location identifier in the WMS, or determine the second storage location after the movement of the particular inventory item based on the detected on-item identifier of the particular inventory item and the association between the detected on-item identifier of the particular inventory item and the second storage-location identifier in the WMS, and based on the first storage location determined before the movement of the particular inventory item, determine a location of the robotic device in the warehouse environment relative to the first storage location, or based on the second storage location determined after the movement of the particular inventory item, determining the location of the robotic device in the warehouse environment relative to the second storage location.

20. The robotic device of claim 19, wherein the on-item identifier for each inventory item and the storage-location identifier for each storage location are barcodes, wherein the sensor is a camera, and wherein the sensor data is image data captured by the camera.

21. The robotic device of claim 19, wherein the computing system is further configured to:

determine a navigation instruction based on the determined location of the robotic device; and cause the robotic device to move within the warehouse environment based on the navigation instruction.

* * * * *